(12) United States Patent
Pitsenbarger

(10) Patent No.: US 7,152,833 B1
(45) Date of Patent: Dec. 26, 2006

(54) CABINET SUPPORT UNIT

(76) Inventor: Gary W. Pitsenbarger, 4430 N. Ashland Ave., Apt. 2E, Chicago, IL (US) 60640

( * ) Notice: Subject to any disclaimer, the term of this patent is extended or adjusted under 35 U.S.C. 154(b) by 276 days.

(21) Appl. No.: 10/918,290

(22) Filed: Aug. 16, 2004

(51) Int. Cl.
*A47B 88/00* (2006.01)
(52) U.S. Cl. .................. 248/161; 248/419; 312/312
(58) Field of Classification Search ............... 52/127.2; 312/312
See application file for complete search history.

(56) References Cited

U.S. PATENT DOCUMENTS

| | | | |
|---|---|---|---|
| 575,543 A | 1/1897 | Clarke | |
| 1,581,960 A | 4/1926 | King | |
| 4,520,981 A | 6/1985 | Harrigan | |
| 4,981,288 A | 1/1991 | Goss | |
| 5,169,219 A | 12/1992 | Obbink | |
| 6,238,159 B1 | 5/2001 | Pappas | |

*Primary Examiner*—Carl D. Friedman
*Assistant Examiner*—Steven Marsh
(74) *Attorney, Agent, or Firm*—Donald R. Schoonover

(57) ABSTRACT

A T-shaped unit includes a first section that is vertical when the unit is in use and a second section that is horizontal when the unit is in use. The first section includes two telescopingly connected elements and the second section includes two elements that are slidingly connected to the first section to slide in a horizontal plane. A soft furniture-engaging element is also included in the second section and one or more clips are provided to lock the sliding elements in a selected position.

4 Claims, 1 Drawing Sheet

U.S. Patent
Dec. 26, 2006
US 7,152,833 B1
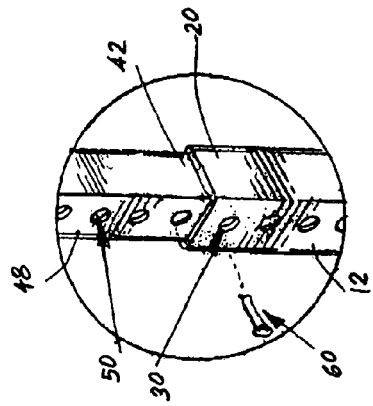
FIG. 3.
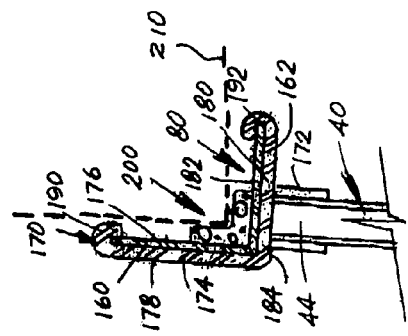
FIG. 2.
FIG. 4.
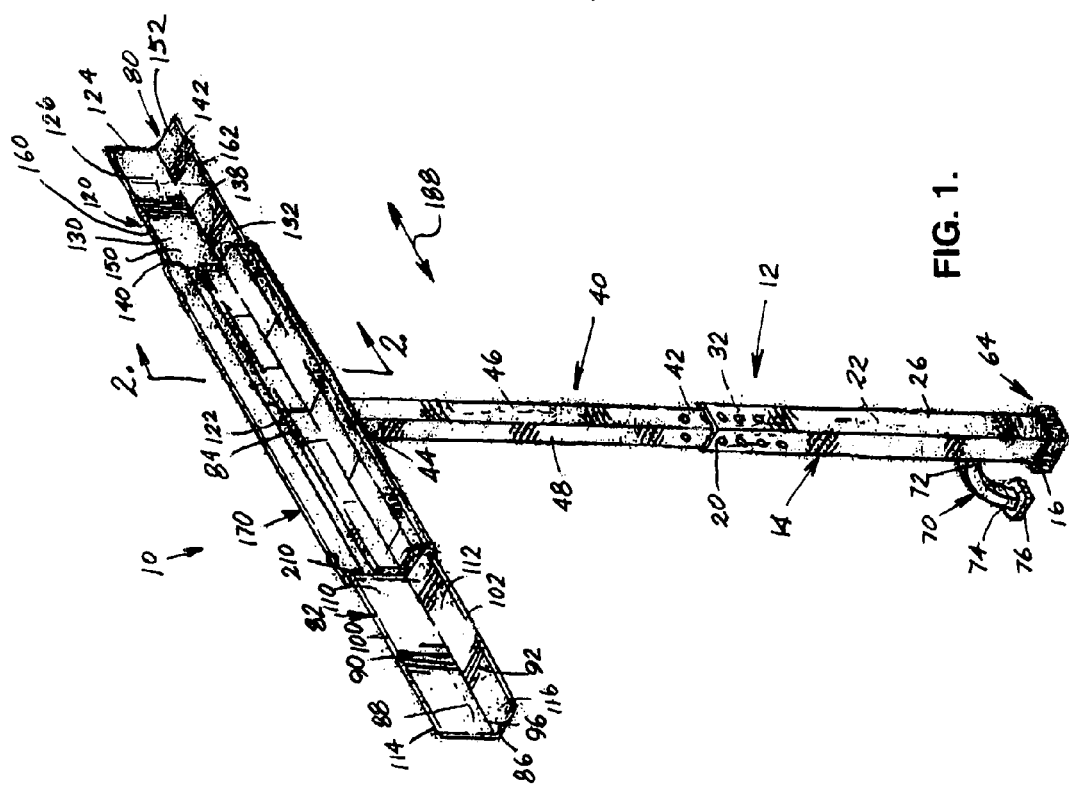
FIG. 1.

CABINET SUPPORT UNIT

BACKGROUND OF THE INVENTION

1. Field of the Invention

The present invention relates to the general art of supports, and to the particular field of work supports.

2. Discussion of the Related Art

Many workers require helpers to support a workpiece in position. A prime example of this is a cabinet installer. Many cabinets are bulky and heavy and must be supported in a very precise location as the cabinet is being fixed to a support, such as a wall or the like. This task often takes two or more individuals: one to support the cabinet in place and one to place the anchoring elements in the cabinet and the support. This can be a costly and time-consuming task. Even then, a human supporting a cabinet, especially a heavy and bulky cabinet, may move before the cabinet is anchored in place. Such movement may upset the precise locating of the cabinet and result in still further wasted time and effort.

Therefore, there is a need for a support unit for holding a cabinet in place during installation.

While the art does contain several examples of elements used to support cabinets while the cabinet is being worked on or installed, the prior art devices known to the inventor do not have the capability of adjusting in several directions. Since some cabinets are larger than others, a support should have the capability of being adjustable to accommodate both large and small cabinets. Otherwise, a worker may be required to own several supports or he may not be able to support some cabinets.

Therefore, there is a need for an adjustable support unit for holding a cabinet in place during installation.

Any adjustment should be easy and expeditious to effect, otherwise some of the advantages associated with the unit being adjustable will be lost.

Therefore, there is a need for a support unit for holding a cabinet in place during installation which is easily and expeditiously adjusted.

Still further, since many cabinets have a special finish, any installation of the cabinets must occur without endangering the finish of the cabinets. For example, if a cabinet is supported on a support unit that scratches or otherwise mars the finish of the cabinet, the cabinet may have to be replaced. This will create extra expense and cost time, which will more than match any savings associated with use of the support element.

Therefore, there is a need for a support unit for holding a cabinet in place during installation which is easily and expeditiously adjusted and which will not mar the surface of a cabinet being supported.

PRINCIPAL OBJECTS OF THE INVENTION

It is a main object of the present invention to provide a support unit for holding a cabinet in place during installation.

It is another object of the present invention to provide an adjustable support unit for holding a cabinet in place during installation.

It is another object of the present invention to provide a support unit for holding a cabinet in place during installation which is easily and expeditiously adjusted.

It is another object of the present invention to provide a support unit for holding a cabinet in place during installation which is easily and expeditiously adjusted and which will not mar the surface of a cabinet being supported.

SUMMARY OF THE INVENTION

These, and other, objects are achieved by a T-shaped support unit that includes a vertical support element formed of two telescopingly connected sections and a horizontal support element which includes two sections slidingly connected to a soft cabinet-engaging element. One or more clips can be used to lock the horizontal support elements in position.

Using an embodiment of the present invention will support a cabinet while that cabinet is being anchored to a support, such as a wall or the like. The support can be easily and expeditiously adjusted whereby both large and small cabinets can be accommodated by the same support unit and a worker need not own several different support units. The support unit has a soft support element that abuts the cabinet when the cabinet is being supported whereby the finish of the cabinet will not be marred by contact with the support element.

BRIEF DESCRIPTION OF THE DRAWING FIGURES

FIG. 1 is a perspective view of a cabinet support embodying the present invention.

FIG. 2 is a sectional view taken along line 2—2 of FIG. 1.

FIG. 3 is a detailed view showing the joint between two support elements of the cabinet support shown in FIG. 1.

FIG. 4 is a perspective view of a clip used to hold portions of a head element of the cabinet support in position, according to the present invention.

DETAILED DESCRIPTION OF THE PREFERRED EMBODIMENT

Other objects, features and advantages of the invention will become apparent from a consideration of the following detailed description and the accompanying drawings.

Referring to the Figures, it can be understood that the present invention is embodied in a cabinet support unit 10.

Cabinet support unit 10 comprises a first section 12 which is vertical in a use orientation supporting a cabinet during installation of the cabinet such as shown in FIG. 1.

First section 12 includes a first element 14 that is a bottom element when first section 12 is in use. First element 14 includes a first end 16 which is a bottom end in use, a second end 20, and a longitudinal axis 22 which extends between first end 16 and second end 20. A side wall 26 connects first end 16 to second end 20. A plurality of holes, such as hole 30, are defined in side wall 26 near second end 20 and are spaced apart from each other in the direction of longitudinal axis 22. First element 14 is hollow and has a bore 32 which extends from second end 20 toward first end 16.

A second element 40 is a top element when first section 12 is in use. Second element 40 includes a first end 42 which is a lower end in use, a second end 44 which is a top end of second element 40 in use, and a longitudinal axis 46 which extends between first end 42 and second end 44. A side wall 48 connects first end 42 to second end 44. A plurality of holes, such as hole 50, are defined in side wall 48 near first end 42 and are spaced apart from each other in the direction of longitudinal axis 46. Side wall 48 is sized relative to side wall 26 so second element 40 is telescopingly received in bore 32 of first element 14 with holes 30 being alignable with holes 50 as can be understood from the teaching of FIG. 3.

A locking pin 60 is accommodated in holes 30 and 50 when the holes are aligned with each other.

A soft cover 64 is located on bottom end 16 of first element 14.

A U-shaped support arm 70 has a first end 72 fixed to side wall 26 adjacent to bottom end 16, a second end 74 located adjacent to bottom end 16, and a support base element 76 on second end 74 of support arm 70. Support base element 76 is co-planar with soft cover 64 on the bottom end 16 of the first element 14 and is spaced apart from the bottom end 16 of the first element 14.

A second section 80 is horizontal in a use orientation supporting a cabinet during installation of the cabinet as shown in FIG. 1.

Second section 80 includes a first L-shaped element 82 which has a first end 84, a second end 86, and a longitudinal axis 88 which extends between first end 84 and second end 86. A first leg 90 is oriented vertically when first L-shaped element 82 is in use, and a second leg 92 is oriented horizontally when first L-shaped element 82 is in use. The first and second legs 90 and 92 of first L-shaped element 82 intersect each other to form a right angle 96. An outer edge 100 is located on first leg 90 and an outer edge 102 is located on second leg 92. A first cabinet-facing surface 110 is on first leg 90 and is oriented vertically when the first L-shaped element 82 is in use. A second cabinet-facing surface 112 is on second leg 92 and is oriented horizontally when the first L-shaped element 82 is in use. A first outer surface 114 is on first leg 90 and is oriented vertically when the first L-shaped element 82 is in use, and a second outer surface 116 is on second leg 92 of the first L-shaped element 82 and is oriented horizontally when the first L-shaped element 82 is in use.

A second L-shaped element 120 has a first end 122, a second end 124, and a longitudinal axis 126 which extends between first end 122 and second end 124. A first leg 130 is oriented vertically when second L-shaped element 120 is in use and a second leg 132 is oriented horizontally when second L-shaped element 120 is in use. First leg 130 intersects second leg 132 at a right angle 138. First leg 130 of the second L-shaped element 120 has an outer edge 140 and second leg 132 of the second L-shaped element 120 has an outer edge 142 spaced apart from intersection 138. A first cabinet-facing surface 150 is on first leg 130 of the second L-shaped element 120 and is oriented vertically when the second L-shaped element 120 is in use, and a second cabinet-facing surface 152 is on second leg 132 of the second L-shaped element 120 and is oriented horizontally when the second L-shaped element 120 is in use. A first outer surface 160 is located on first leg 130 and is oriented vertically when second L-shaped element 120 is in use and a second outer surface 162 is located on second leg 132 which is oriented horizontally when second L-shaped element 120 is in use. First end 122 of the second L-shaped element 120 is located adjacent to first end 84 of first L-shaped element 82. The first cabinet-facing surfaces 110, 150 and the first outer surfaces 114, 160 of the first and second L-shaped elements 82, 120 are co-planar with each other when second section 80 is in use. The second cabinet-facing surfaces 112, 152 and the second outer surfaces 116, 162 of the first and second L-shaped elements 82, 120 are co-planar with each other when second section 80 is in use.

An L-shaped sleeve 170 is mounted on second end 44 of second element 40 of first section 12 by a collar 172, or the like. L-shaped sleeve 170 includes a first portion 174 which is oriented vertically when sleeve 170 is in use and which includes an inside surface 176 and an outside surface 178. A second portion 180 is oriented horizontally when sleeve 170 is in use and includes an inside surface 182 and an outside surface 184. Inside surface 176 of first portion 174 of the L-shaped sleeve 170 abuts the first outer surfaces 114, 160 of both of the first and second L-shaped elements 82 and 120. The first and second L-shaped elements 82, 120 are slidingly connected to the L-shaped sleeve 170 to be slidingly connected together via the L-shaped sleeve 170 and to move toward and away from each other as indicated in FIG. 1 by double-headed arrow 188. A first U-shaped hook portion 190 is located on first portion 174 of the L-shaped sleeve 170 and a second U-shaped hook portion 192 is located on second portion 180 of the L-shaped sleeve 170. First U-shaped hook portion 190 slidingly engages the outer edges 100, 140 of the first legs 90, 130 of the first and second L-shaped elements 82, 120 and second U-shaped hook portion 192 slidingly engages the outer edges 102, 142 of the second legs 92, 132 of the first and second L-shaped elements 82, 120.

An L-shaped cabinet-supporting liner 200 is mounted on the inside surfaces 110, 112, 150, 152 of the first and second legs 90, 92, 130, 132 of the first and second L-shaped elements 82, 120. Cabinet-supporting element 200 is formed of foam-like material so it can contact and support a cabinet without marring the finish of the cabinet.

A locking element 210 is shown in FIG. 4 and is sized to slidingly fit on one of the L-shaped elements 82, 120 of second section 80, as indicated in FIG. 1 by the dotted line, to hold the second section 80 in a selected position. If suitable, two locking elements 210 can be used, with one locking element 210 being located adjacent to each end of sleeve 170.

Use of unit 10 is easily understood by one skilled in the art based on the teaching of the present disclosure. Accordingly, such use will only be briefly outlined. Unit 10 is placed on a supporting surface and is oriented vertically. The height of the unit 10 is adjusted using the telescoping feature of the first section 12 and the width of the unit 10 is adjusted using the sliding feature of the second section 80 so a cabinet can be securely supported in a selected position. A cabinet is then placed on the cabinet-supporting element 200, as indicated by the broken lines designated by numeral 210 in FIG. 2, and supported in position until the cabinet can be anchored to a support. Unit 10 can then be collapsed and moved out of the way.

It is understood that while certain forms of the present invention have been illustrated and described herein, it is not to be limited to the specific forms or arrangements of parts described and shown.

What is needed and desired to be covered by Letters Patent is as follows:

1. A cabinet support unit comprising:
   (a) a first section which is vertical in a use orientation supporting a cabinet during installation of the cabinet, the first section including
      (1) a first element that is a bottom element when said first section is in use, the first element including a first end which is a bottom end in use, a second end, a longitudinal axis extending between the first end of the first element and the second end of the first element, a side wall connecting the first end of the first element to the second end of the first element, a plurality of holes defined in the side wall of the first element near the second end of the first element and which are spaced apart from each other in the direction of the longitudinal axis of the first element, the first element being hollow and having a bore which extends from the second end of the first element toward the first end of the first element,
(2) a second element that is a top element when said first section is in use, the second element including a first end which is a lower end in use, a second end which is a top end of the second element in use, a longitudinal axis which extends between the first end of the second element and the second end of the second element, a side wall connecting the first end of the second element to the second end of the second element, a plurality of holes defined in the side wall of the second element near the first end of the second element and which are spaced apart from each other in the direction of the longitudinal axis of the second element, the side wall of the second element being sized relative to the side wall of the first element so the second element is telescopingly received in the bore of the first element with the holes defined in the side wall of the first element being alignable with the holes defined it in the side wall of the second element,
(3) a locking pin that is accommodated in the holes defined in the side wall of the first element and the side wall of the second element when the holes are aligned with each other,
(4) a soft cover on the bottom end of the first element, and
(5) a U-shaped support arm having a first end fixed to the side wall of the first element adjacent to the bottom end of the first element, a second end which is located adjacent to the bottom end of the first element, a support base element on the second end of the support arm, the support base element being co-planar with the soft cover on the bottom end of the first element and being spaced apart from the bottom end of the first element;
(b) a second section which is horizontal in a use orientation supporting a cabinet during installation of the cabinet, the second section including
(1) a first L-shaped element having a first end, a second end, a longitudinal axis extending between the first end of the first L-shaped element and the second end of the first L-shaped element, a first leg which is oriented vertically when the first L-shaped element is in use, a second leg which is oriented horizontally when the first L-shaped element is in use, the first and second legs of the first L-shaped element intersecting each other to form a right angle, an outer edge on the first leg of the first L-shaped element, an outer edge on the second leg of the first L-shaped element, a first cabinet-facing surface on the first leg of the first L-shaped element and which is oriented vertically when the first L-shaped element is in use, a second cabinet-facing surface on the second leg of the first L-shaped element and which is oriented horizontally when the first L-shaped element is in use, a first outer surface on the first leg of the first L-shaped element that is oriented vertically when the first L-shaped element is in use, and a second outer surface on the second leg of the first L-shaped element that is oriented horizontally when the first L-shaped element is in use,
(2) a second L-shaped element having a first end, a second end, a longitudinal axis extending between the first end of the second L-shaped element and the second end of the second L-shaped element, a first leg that is oriented vertically when the second L-shaped element is in use, a second leg that is oriented horizontally when the second L-shaped element is in use, the first leg of the second L-shaped element intersecting the second leg of the second L-shaped element at a right angle, the first leg of the second L-shaped element having an outer edge and the second leg of the second L-shaped element having an outer edge spaced apart from the intersection between the first L-shaped element and the second L-shaped element, a first cabinet-facing surface on the first leg of the second L-shaped element and which is oriented vertically when the second L-shaped element is in use, a second cabinet-facing surface which on the second leg of the second L-shaped element and which is oriented horizontally when the second L-shaped element is in use, a first outer surface on the first leg of the second L-shaped element and which is oriented vertically when the second L-shaped element is in use, and a second outer surface which is on the second leg of the second L-shaped element and which is oriented horizontally when the second L-shaped element is in use, the first end of the second L-shaped element being located adjacent to the first end of the first L-shaped element, the first cabinet-facing surfaces and the first outer surfaces of the first and second L-shaped elements being co-planar with each other when said second section is in use, the second cabinet-facing surfaces and the second outer surfaces of the first and second L-shaped elements being co-planar with each other when said second section is in use,
(3) an L-shaped sleeve mounted on the second end of the second element of said first section, the L-shaped sleeve including a first portion which is oriented vertically when the sleeve is in use and which includes an inside surface and an outside surface, a second portion that is oriented horizontally when the sleeve is in use and which includes an inside surface and an outside surface, the inside surface of the first portion of the L-shaped sleeve abutting the outer surfaces of both of the first and second L-shaped elements, the first and second L-shaped elements being slidingly connected to the L-shaped sleeve to be slidingly connected together via the L-shaped sleeve and to move toward and away from each other, a first U-shaped hook portion on the first portion of the L-shaped sleeve, a second U-shaped hook portion on the second portion of the L-shaped sleeve, the first U-shaped hook portion of the L-shaped sleeve slidingly engaging the outer edges of the first legs of the first and second L-shaped elements, and the second U-shaped hook portion slidingly engaging the outer edges of the second legs of the first and second L-shaped elements;
(c) an L-shaped cabinet-supporting liner mounted on the inside surfaces of the first and second legs of the first and second L-shaped elements, the cabinet-supporting element being formed of foam-like material; and
(d) a locking element that is sized to slidingly fit on one of the L-shaped elements of said second section.

2. A cabinet support unit comprising:
(a) a first section which is vertical during installation of a cabinet, the first section including
(1) a first element including a first end, a second end, a longitudinal axis extending between the first end and the second end, and a plurality of holes defined in the second end which holes are spaced apart from each other in the direction of the longitudinal axis, the first element being hollow and having a bore which extends from the second end toward the first end,
(2) a second element including a first end, a second end, a longitudinal axis extending between the first end and the second end, a plurality of holes defined in the first end which are spaced apart from each other in the direction of the longitudinal axis, the second element being sized relative to the first element wherein the second element is telescopingly receivable in the bore of the first element with the holes defined in the first element being alignable with the holes defined in the second element,
(3) a locking pin accommodatable in the holes defined in the first and second elements when the holes are aligned with each other,
(4) a soft cover on the first end of the first element, and
(5) a support arm having a first end thereof fixed to the first element, a second end with a support base element that is co-planar with the soft cover on the first end of the first element;
(b) a horizontally oriented second section including:
(1) a first L-shaped element having a first end, a second end, a longitudinal axis extending between the first end and the second end, a vertically oriented first leg, and a horizontally oriented second leg; wherein the first and second legs intersect each other to form a right angle; wherein the first leg includes an outer edge, a first cabinet-facing surface, and a first outer surface; and wherein the second leg includes an outer edge, a second cabinet-facing surface, and a second outer surface,
(2) a second L-shaped element having a first end, a second end, a longitudinal axis extending between the first end and the second end, a vertically oriented first leg, a horizontally oriented second leg; wherein the first leg and the second leg intersect at a right angle; wherein the first leg includes an outer edge, a first cabinet-facing surface, and a first outer surface; wherein the second leg includes an outer edge, a second cabinet-facing surface, and a second outer surface; and wherein the first end of the second L-shaped element is located adjacent to the first end of the first L-shaped element, the first cabinet-facing surfaces and the first outer surfaces of the first and second L-shaped elements are co-planar with each other, and the second cabinet-facing surfaces and the second outer surfaces of the first and second L-shaped elements are co-planar with each other, and
(3) an L-shaped sleeve mounted on the second end of the second element, the L-shaped sleeve including a vertically oriented first portion which includes an inside surface and an outside surface, a horizontally oriented second portion which includes an inside surface and an outside surface, the inside surface of the first portion abutting the second outer surfaces of both of the first and second L-shaped elements wherein the first and second L-shaped elements are slidingly connected together via the L-shaped sleeve and to move toward and away from each other, a first U-shaped hook portion on the first portion of the L-shaped sleeve, and a second U-shaped hook portion on the second portion of the L-shaped sleeve wherein the first U-shaped hook portion of the L-shaped sleeve slidingly engages the outer edges of the second legs of the first and second L-shaped elements and the second U-shaped hook portion slidingly engages the outer edges of the first legs of the first and second L-shaped elements; and
(c) an L-shaped cabinet-supporting element formed of foam-like material and mounted on the inside surfaces of the first and second L-shaped elements.

3. A cabinet support unit as described in claim 2, further comprising a locking element sized to slidingly fit on one of the first and second L-shaped elements.

4. A cabinet support unit as described in claim 2, further comprising locking elements sized to slidingly fit on each of the first and second L-shaped elements.

* * * * *